July 9, 1957 H. V. MONKOWSKI 2,798,269
METHOD OF RESURFACING WORN MACHINE PARTS
Filed March 4, 1954 3 Sheets-Sheet 1
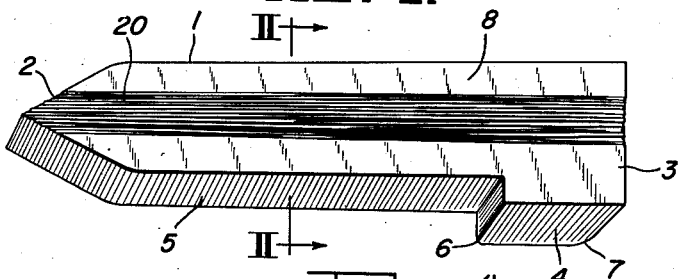
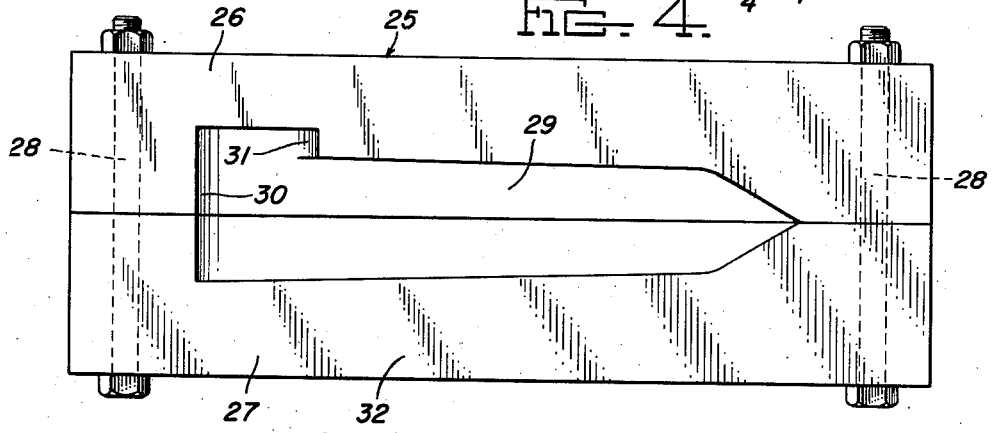
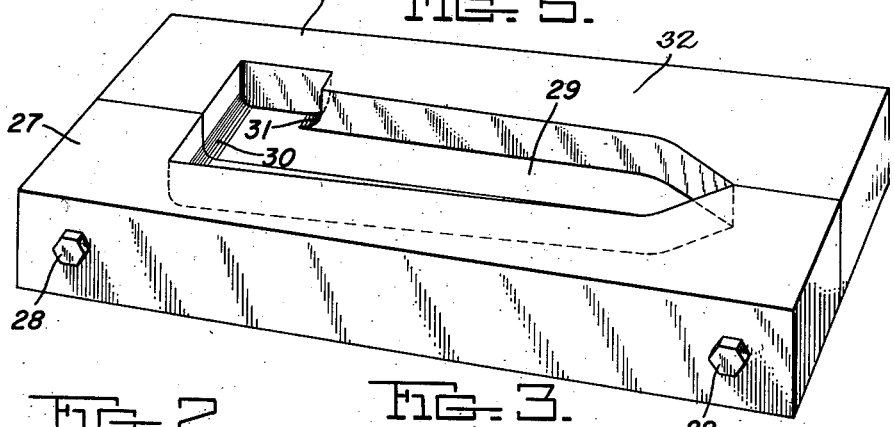
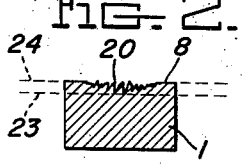
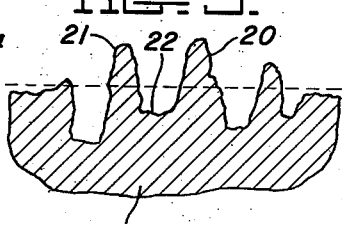
INVENTOR:
HENRY V. MONKOWSKI,
BY: Donald G. Dalton
his Attorney.

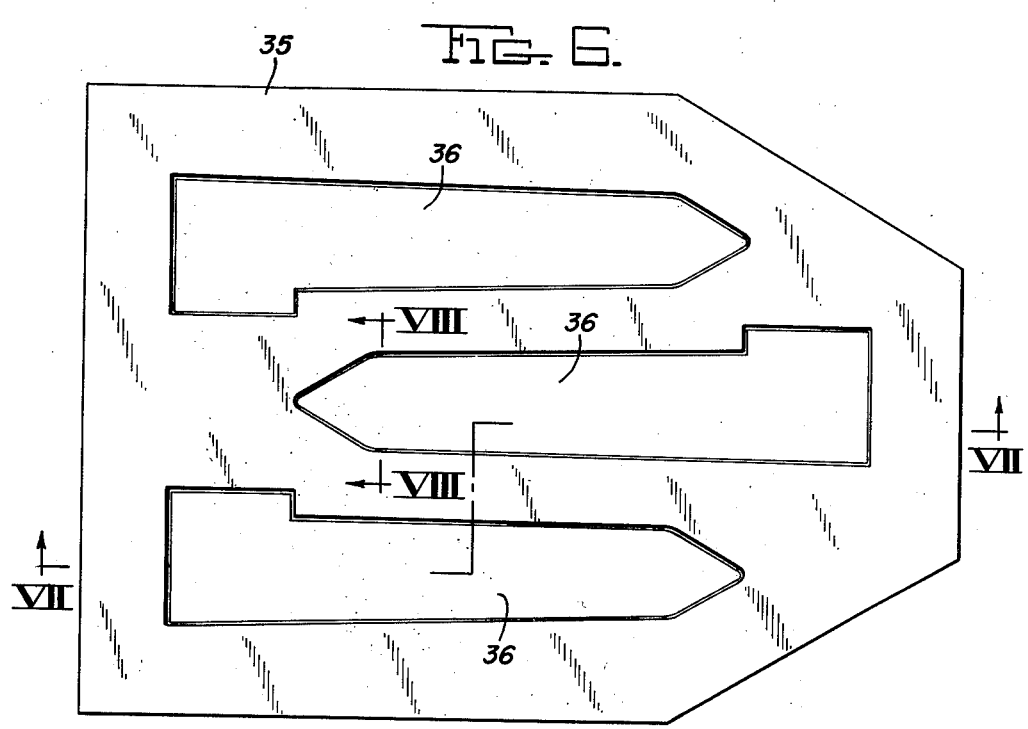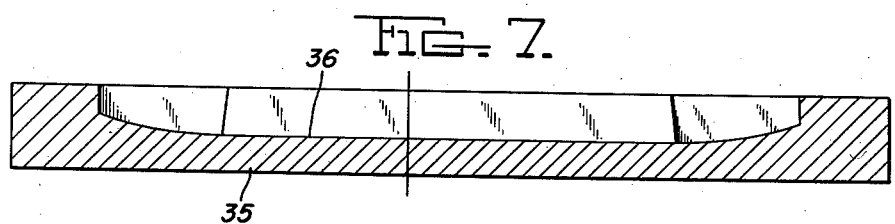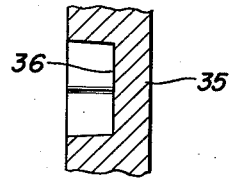

July 9, 1957 H. V. MONKOWSKI 2,798,269
METHOD OF RESURFACING WORN MACHINE PARTS
Filed March 4, 1954 3 Sheets-Sheet 3
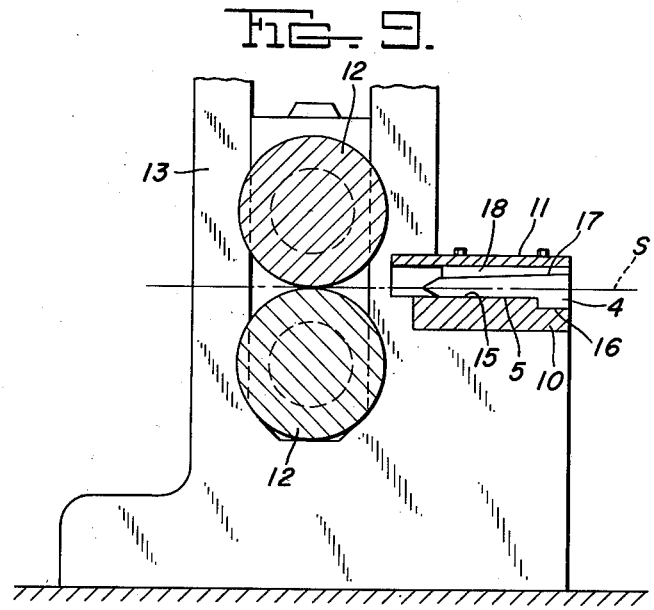
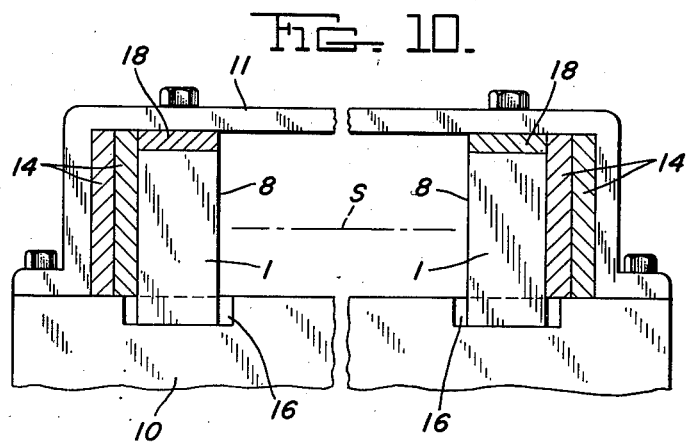
INVENTOR:
HENRY V. MONKOWSKI,
BY: Donald G. Dalton
his Attorney.

United States Patent Office 2,798,269
Patented July 9, 1957

2,798,269

METHOD OF RESURFACING WORN MACHINE PARTS

Henry V. Monkowski, Cleveland, Ohio, assignor to United States Steel Corporation, a corporation of New Jersey Application March 4, 1954, Serial No. 414,131

2 Claims. (Cl. 22—200)

This invention relates to a method for refinishing the guiding surfaces of bronze guides which have become serrated or grooved from use in guiding the movement of strip or sheet through a cold rolling mill.

In the rolling of strip and sheet, guides are provided for guiding engagement with the edges of the sheet or strip to maintain its movement through the mill in a straight line perpendicular to the axis of the rolls and to prevent lateral movement thereof. For this purpose, stationary bronze guides are commonly employed. Such guides have guiding surfaces against which the edges of the sheet or strip have bearing and guiding engagement whenever strip or sheet tends to move laterally with respect to mill. The fabrication of the guides from bronze metal is a preferred practice since this metal does not crumble or granulate into small particles which would be rolled into the strip or sheet or mar the high finish on the rolls. Although the bronze metal wears off the guide in the form of a microscopic film on the strip or sheet, this is not detrimental to the rolls or to the sheet or strip. While attempts have been made to provide guides of other materials, the use of stationary bronze guides continues.

In use, the guiding surfaces of the bronze guides which are initially flat smooth surfaces in a plane normal to the sheet or strip become grooved or serrated along lines extending in the direction of movement of the strip and lengthwise of the guiding surface. The formation of grooves or serrations in this manner is due both to the cutting and wearing action of the strip when bearing against the guiding surface and to flow of metal laterally outwardly over the edges of the strip under the pressure exerted by the strip. After a period of time, the grooved condition of the guiding surfaces becomes so pronounced that guiding action is interfered with and refinishing is required. This has been accomplished conventionally by machining the guiding surfaces after removal of the guides from the mill, sufficient metal being machined away to remove the serrations in the guiding surfaces. The removal of metal incident to refinishing in this manner eventually requires replacement of the worn guides.

This invention has, accordingly, as one of its principal objects, the provision of a refinishing method which both eliminates the relatively expensive machining operation heretofore required for reconditioning worn guides and effects the reconditioning of the guiding surface without removal of metal from the body of the guide. In a manner to be described, this is accomplished by melting the worn guide while contained in a mold cavity and thereby causing the bronze in the grooved surface of the guide to flow and flatten itself into a smooth plane which is free of any surface indentations.

Other objects and advantages of the invention will be apparent from the following description.

In the drawings there is shown a typical bronze guide to be reconditioned in accordance with the principles of this invention together with two embodiments of molds suitable for use in practicing the method of this invention. In this showing:

Figure 1 is a perspective view of a conventional guide showing the condition of its guiding surface after a period of use in a strip or sheet rolling mill;

Figure 2 is a sectional view taken substantially along the line II—II of Figure 1 and Figure 3 is an enlarged and fragmentary showing of a portion of the guide shown in Figure 2;

Figure 4 is a plan view of a mold in which the guide of Figure 1 is received during a reconditioning operation;

Figure 5 is a perspective view of the mold shown in Figure 4;

Figure 6 is a plan view of a mold having multiple mold cavities for the reception of guides of a modified form;

Figures 7 and 8 are respectively sectional views taken in the plane of lines VII—VII and VIII—VIII of Figure 6;

Figure 9 is a sectional view of a strip rolling mill showing the manner in which the guide of Figure 1 is mounted in position therein; and Figure 10 is an enlarged and elevational view of the guide housing looking from the right of Figure 9.

Bronze guides for sheet and strip rolling mills are fabricated in a multiplicity of shapes and sizes, and are mounted in the mills in both vertical and horizontal positions according to the requirements of the mill. Accordingly, it is to be understood that the method of this invention is applicable to all types of stationary bronze guides regardless of their shape, size or mounted position in a mill, and that the showing of the accompanying drawings is merely exemplary of the practice of the method of this invention.

Referring now to the drawings, and to Figure 1 thereof, the numeral 1 designates a bronze guide of conventional construction which has a pointed forward end 2 and an enlargement 3 at its rear end providing a downwardly extending mounting lug 4 which projects below the base 5 of the guide. The rear corner 6 of the mounting projection and the rear corner 7 of the guide are rounded as shown to facilitate mounting in a mill. The side face 8 provides a guiding surface for guiding strip or sheet through a mill.

The manner in which guides, such as the guide 1 of Figure 1, are mounted in a mill is shown in Figures 9 and 10. In this showing, a guide table 10 has a guide box 11 mounted thereon and through which the strip S moves to a pair of rolls 12 mounted in a mill housing 13. Two guides are mounted in the housing 11 with their guiding surfaces 8 facing the edges of the strip S as shown in Figure 10. Guiding shims or tapered wedges 14 are provided for adjusting the lateral position of the guides 1 with respect to the strip S. As shown in Figure 9, the guides when mounted in position have their bottom surfaces 5 resting on the upper surface 15 of the table 10 which has notches 16 for the reception of the mounting portions 4. The upper surface 17 of the guide has a taper forwardly and downwardly as viewed in Figure 10 for engagement with a tapered wedge 18 which is bolted to the top of the housing.

In the movement of the strip S through the mill, its edges have sliding engagement with the surfaces 8 when conditions arise tending to cause the strip to move laterally as viewed in Figure 10. By reason of the bronze being a relatively softer metal, such bearing and guiding engagement of the edges of the strip S with the guide surfaces 8 causes the surfaces 8 to be grooved or serrated as at 20 in Figure 1, the grooves or serrations extending longitudinally of the guide. Figures 2 and 3 show the condition of the serrated portion of the surface 8 when sufficient wear has taken place to require refinishing of the surface 8. As best shown in Figure 3, the serrated surface 20 is comprised of ridges 21 and grooves 22. The formation of the ridges 21 and grooves 22 is due to the combined cutting action of the strip edges bearing against the guide surfaces 8 and lateral flow of the bronze metal over the edges of the strip under the pressure of the strip bearing thereagainst. As pointed out above, the conventional practice of refinishing the surface 8 to remove the worn surface 20 is a machining operation which requires removal of the metal upwardly of the line 23 in Figure 2 after which the renewed guide surface 8 coincides with the line 23. Obviously after a relatively few refinishing operations of this character, replacement of the guides becomes necessary. As distinguished from conventional practice, the practice of the method of this invention results in the refinished surface falling along the broken line 24 which substantially coincides with the original guiding surface 8 as best shown in Figure 2.

In practicing the method of this invention, the stationary bronze guide is placed in a mold having a cavity of a shape corresponding to the shape of the guide so that its guiding surface 8 is flush with the top surface of the mold or bears against the bottom surface thereof. The mold with the bronze guide in position in its cavity is then placed in a furnace where it is subjected to a temperature sufficient to melt the bronze guide. The mold is fabricated from steel which has a relatively higher melting temperature and the furnace temperature is of course held at a point well below the melting point of steel. As the surface 8 of the bronze guide is heated to the melting point, the ridges 21 melt and flow into the grooves 22. In this manner, the metal along the scored portion 20 of the surface 8 flows and flattens itself into planar shape, the surface 24 of which substantially coincides with the original guiding surface 8. If considerable wear of the guiding surface 8 has taken place, a few bronze chips may be placed on the surface 8 prior to heating to compensate for the bronze transferred to the strip by wear. It is preferred that the furnace in which the melting of the guide is effected while contained in the mold be provided with a non-oxidizing atmosphere to prevent undue oxidation of the bronze although this is not essential, satisfactory results being obtained by conducting the heating operation in air.

Figures 4 and 5 show the construction of a mold having a cavity in which the guide of Figure 1 is received prior to heating to a melting temperature. In this showing, the mold is designated as a whole by the numeral 25 and is comprised of two parts 26 and 27 which are secured together by bolts 28. The parts 26 and 27 are machined to provide a cavity 29 in which the guide 1 is received, the cavity 29 being filleted at 30 and 31 to receive the grooved corners 6 and 7 on the backside of the guide as viewed in Figure 1. When the guide 1 is inserted in the cavity 29, its surface 8 is preferably flush with the surface 32 of the mold, or slightly below the surface 32. The mold 25 with guide 1 therein is placed in the furnace with the cavity 29 opening vertically upwardly so that the bronze will not flow out of the mold when it is melted. After the guide contained in the mold has been elevated to a melting temperature so that the surface 8 is melted to a flat and smooth condition in which the ridges 21 and grooves 22 are no longer visible, the mold and guide therein are cooled and the guide is removed from the cavity 29.

The guides 1, due to the groved edges 6 and 7 must be specially constructed for use on opposite sides of the mill, the guide used on the left side not being useable on the right. This of course requires two molds for receiving the two guides. In cases of guides having interchangeable characteristics, a single mold having a single cavity may be used, and, in such case, it will not make any difference whether the guiding surface 8 of the guide faces upwardly or downwardly. When the guide is placed in a cavity with its surface 8 facing downwardly, its surface 8 will flow and flatten itself over the bottom of the mold cavity when the guide is melted.

In Figures 6 through 8 there is shown a modified form of mold for the reception of guide inserts of a slightly different shape. In this showing, the mold body 35 is an integral casting having plural mold cavities 36 therein. In a mold of this type, stripping of the guides from the cavities 36 is readily effected after cooling due to the difference in thermal expansion and contraction of bronze as compared to the steel from which the mold 35 is formed.

From the foregoing, it will be apparent that the method of refinishing bronze guides of this invention eliminates the costly machining operations heretofore required. To refinish the guide, it is only necessary to place the worn guide in a mold and subject it to a melting temperature at which its serrated surface melts and flows into planar shape, the essential shape of the guide being retained by the mold during the heating operation. Attention is particularly directed to the fact that the refinishing of bronze guide surfaces in this manner is effected without the removal or loss of any metal from the body of the guide.

While one embodiment of my invention has been shown and described it will be apparent that other adaptations and modifications may be made without departing from the scope of the following claims.

I claim:

1. A method of refinishing to planar form a bronze guide guiding surface which has a non-uniform level in a transverse direction and is defined by projections and indentations extending longitudinally of the guide resulting from guiding contact with strip moving through a rolling mill which comprises placing the guide in a mold having a mold cavity shaped precisely to the contour of at least the peripheral portions and one side of the guide, and applying heat to the mold and the guide therein to heat the guide to a temperature at which the metal forming its guiding surface is molten so that said projections flow into and fill said indentations to produce a surface which has a uniform level.

2. A method of refinishing a strip rolling mill bronze guide which comprises providing a mold of a metal having a melting temperature higher than the melting temperature of bronze and having a mold cavity therein shaped to the contour of the guide and an opening at its upper end the periphery of which conforms to the periphery of the guide, placing the guide in said cavity with its guiding surface substantially flush with said opening, heating the mold and guide therein to a temperature above the melting temperature of bronze but less than the melting temperature of the mold metal so that at least the portion of the guide forming its guiding surface is molten, and thereafter cooling the mold and guide to solidify the guide metal and removing the guide from said cavity.

References Cited in the file of this patent

UNITED STATES PATENTS

| 356,031 | Currie et al. | Jan. 11, 1887 |
|---|---|---|
| 947,835 | Meissner | Feb. 1, 1910 |
| 1,217,581 | Eldred | Feb. 27, 1917 |
| 1,531,472 | Baker | Mar. 31, 1925 |
| 1,812,172 | Rohn | June 30, 1931 |
| 1,950,356 | De Bats | Mar. 6, 1934 |
| 2,250,561 | Wissler | July 29, 1941 |
| 2,433,903 | Hensel et al. | Jan. 6, 1948 |
| 2,440,952 | Hurley | May 4, 1948 |
| 2,557,971 | Jacklin | June 26, 1951 |